US006966264B2

(12) United States Patent
Solberg et al.

(10) Patent No.: US 6,966,264 B2
(45) Date of Patent: *Nov. 22, 2005

(54) ROCKET MOTORS WITH INSENSITIVE MUNITIONS SYSTEMS AND PROJECTILES INCLUDING SAME

(75) Inventors: Mark A. Solberg, Bel Air, MD (US); Robert E. Black, Newark, DE (US)

(73) Assignee: Alliant Techsystems Inc., Edina, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 10/645,706

(22) Filed: Aug. 21, 2003

(65) Prior Publication Data

US 2004/0050282 A1 Mar. 18, 2004

Related U.S. Application Data

(63) Continuation of application No. 10/016,697, filed on Nov. 1, 2001, now Pat. No. 6,619,029.

(51) Int. Cl.[7] ............................ F42B 15/10; F02K 9/08
(52) U.S. Cl. ......................................... 102/381; 60/223
(58) Field of Search .......................... 102/381; 60/223, 60/253, 254

(56) References Cited

U.S. PATENT DOCUMENTS

| | | | |
|---|---|---|---|
| 2,909,032 | A | 10/1959 | Davies |
| 2,944,390 | A | 7/1960 | Keathley et al. |
| 2,958,184 | A | 11/1960 | Sanders |
| 2,958,185 | A | 11/1960 | Sanders |
| 3,052,091 | A | 9/1962 | D'ooge |
| 3,144,829 | A | 8/1964 | Fox |
| 3,349,708 | A | 10/1967 | Pagel |
| 3,887,991 | A | 6/1975 | Panella |
| 4,187,676 | A | 2/1980 | O'Neil et al. |
| 4,478,151 | A | 10/1984 | Vetter et al. |
| 4,557,198 | A | 12/1985 | Hickey |
| 4,597,261 | A | 7/1986 | Dolan |
| 4,709,637 | A | 12/1987 | Boggero |
| 4,991,513 | A | 2/1991 | Malamas et al. |
| 5,035,182 | A | 7/1991 | Purcell et al. |
| 5,036,658 | A | 8/1991 | Tate |
| 5,044,154 | A | 9/1991 | English, Jr. et al. |
| 5,060,470 | A | 10/1991 | VanName |
| 5,129,326 | A | 7/1992 | Brogan |
| 5,155,298 | A | 10/1992 | Koontz |
| 5,171,931 | A | 12/1992 | Steele |
| H1144 | H | 3/1993 | Cherry et al. |
| 5,311,820 | A | 5/1994 | Ellingsen |
| 5,337,672 | A | 8/1994 | Boissiere et al. |
| 5,361,703 | A | 11/1994 | Braithwaite |
| 5,398,498 | A | 3/1995 | Mort et al. |
| 5,735,114 | A | 4/1998 | Ellingsen |

(Continued)

FOREIGN PATENT DOCUMENTS

WO WO 01/55665 A1 8/2001

*Primary Examiner*—Aileen Felton
(74) *Attorney, Agent, or Firm*—TraskBritt, PC

(57) ABSTRACT

An embodiment of the rocket motor of this invention employs an insensitive munitions approach that, when subjected to elevated external temperatures, is activated by thermal expansion of the main propellant and gas generation from a secondary insensitive munitions charge. In a preferred embodiment, the rocket motor also includes a pressure equalizing system that accommodates changing temperature conditions during storage as well as varying gas pressure inherent in gun-launched systems in a manner that allows for thinner case cylinder design and increased propellant volume.

23 Claims, 6 Drawing Sheets

U.S. PATENT DOCUMENTS

| | | | | |
|---|---|---|---|---|
| 5,786,544 | A | 7/1998 | Gill et al. | |
| 5,792,981 | A | 8/1998 | Singer et al. | |
| 5,813,219 | A | 9/1998 | Gill et al. | |
| 6,035,631 | A | 3/2000 | Cannon | |
| 6,094,906 | A | 8/2000 | Singer et al. | |
| 6,338,242 | B1 | 1/2002 | Kim et al. | |
| 6,363,855 | B1 | 4/2002 | Kim et al. | |
| 6,619,029 | B2 * | 9/2003 | Solberg et al. | 60/223 |

* cited by examiner

ROCKET MOTORS WITH INSENSITIVE MUNITIONS SYSTEMS AND PROJECTILES INCLUDING SAME

CROSS-REFERENCE TO RELATED APPLICATION

This application is a continuation of application Ser. No. 10/016,697, filed Nov. 1, 2001, now U.S. Pat. No. 6,619, 029, issued Sep. 16, 2003.

BACKGROUND OF THE INVENTION

1. Field of the Invention

The present invention relates to rocket motors, especially for gun-launched projectiles, having insensitive munitions systems.

2. State of the Art

Many launchable projectiles, rockets, and rocket stages comprise a forward end, including guidance and munitions, and an aft end rocket motor. These two elements can be formed together, with a common outer case, or they can be separately formed and subsequently joined together. This joining can occur immediately prior to use, in which case the two elements may be separately stored, or the elements can be joined together for storage purposes and be ready for immediate use.

During prelaunch storage, when a rocket motor is ignited inadvertently by external heating, such as a spilled fuel fire, the rocket motor may become propulsive before being properly aimed. When inadvertent ignition is caused by fragment impact that produces unplanned nozzle outlets, the motor may become wildly propulsive in undesired directions. When such events produce unplanned increases of propellant burning surface area, excessive pressurization may increase the hazard to nearby personnel and property. In light of these dangers, many of today's weapon systems must satisfy certain insensitive munitions (IM) requirements focused on safe storage capabilities.

One way that rocket motors meet IM requirements is by venting the internal pressure caused through inadvertent ignition of the propellant by discharging either the forward or aft closure of the case cylinder. This allows the propellant to burn through a now open end that is relatively large compared to the nozzle throat without generating substantial thrust in any direction and without the threat of the rocket motor exploding and spraying burning propellant and metal case cylinder fragments in numerous directions.

The prior art teaches the use of dual paths for load transfer between features of either closure or between the closure and the motor case cylinder. One such load path may be sized to accommodate relatively small loads that might be experienced during transportation and handling prior to gun launch, and the other to accommodate much larger loads encountered during launch or during rocket motor operation. Focusing on shells that may or may not include rocket motors, U.S. Pat. No. 4,557,198 discloses shear pins or locking rings arranged for arming the high capability load path by axial acceleration during normal launch and disarming the low capability load path. Boissiere, in U.S. Pat. No. 5,337,672 (1994), teaches arming of the high capability load path and disarming the low capability load path by gas pressures produced by the round itself. Dolan, in U.S. Pat. No. 4,597,261 (1986), Panella in U.S. Pat. No. 3,887,991 (1975), Tate in U.S. Pat. No. 5,036,658, Koontz in U.S. Pat. No. 5,155,298 (1992), Ellingsen in U.S. Pat. No. 5,311,820, and Cherry, in Statutory Invention Registration H1144 disclose the use of thermally activated devices of similar intent. Further, Malamas, in U.S. Pat. No. 4,991,513, discloses use of a vent system that is closed by spin-up at launch. Singer et al., in U.S. Pat. No. 6,094,906, discloses a more recent approach for generating a vent path for IM protection.

The safe expulsion of either closure can also be accomplished through the use of a low shear retaining means—positioned between components of the closure or between the closure and the rocket motor case cylinder—and a high capability load path that is disarmed until subjected to gun pressure. Should the propellant be inadvertently ignited, the low shear retention means will shear under relatively low internal pressure and allow the entire closure, or a portion thereof, to disengage from the case cylinder. Thus, the internal pressure induced by inadvertent ignition will vent without the dangers associated with premature propulsion or explosion.

One problem associated with many of these conventional IM systems is that they do not pass slow cook-off tests. For many conventional IM systems, heating at relatively slow rates of about 6° F./hr causes the entire propellant to combust substantially instantaneously prior to activation of the IM systems, producing excess gas which the IM systems are not equipped to handle and safely expel.

In the case of gun-launched missiles, other design criteria that should be taken into consideration pertain to the thermal expansion characteristic of composite solid propellants. Composite solid propellants are one of two general types of solid propellants for rockets. In composite solid propellants, the fuel and oxidizer particles are bound together by a cured rubber matrix. Composite propellants have burning surface areas that may be readily controlled by adjusting the shape of the solid material and the burn rate features of the formulation. The other type of solid propellant is compressed powders. For compressed powders, virtually the entire cumulative surface area of all the particles is available for combustion immediately upon ignition. During the burn of a compressed powder propellant, vastly higher operating pressures prevail than during burn of a like quantity of composite propellants. It follows that compressed powder propellants are generally used only where the gun barrel can withstand the high pressures. When the propellant is to burn after the rocket leaves the gun, generally a composite propellant is chosen.

Typically, a composite solid propellant has a thermal expansion characteristic that is an order of magnitude larger than that of the enclosing or containing structure. A 100° F. (56° C.) change in operating temperature therefore may produce a propellant volume change of about 2%. Unless the configuration and support arrangement allow deformations to occur, thermal stresses in the propellant may cause fractures, undesired increases of burning surface area, and disasters upon ignition. Common provisions for thermal expansion include a central axial perforation for propellant grains bonded on their outer circumferential surfaces to cylindrical vessels and completely free outer surfaces for propellant grains bonded at either their forward or aft ends to vessel closure features.

The threat that gun accelerations may pose to the integrity of a propellant charge may be great unless care is exercised over the propellant configuration and means of supporting the propellant. Accelerations imposed within the gun tube upon gun-launched projectiles are hundreds—even thousands—of times larger than those for rocket-launched projectiles. The tensile and shear strengths and elastic moduli of typical propellants are minuscule in comparison to the containing structure. For this reason, departures from a hydrostatic stress state during gun launch are accompanied by large deformations. At high forward acceleration, the propellant grain tends to completely fill the available volume of the aft end of the containing vessel.

During gun launch, alternatives to the aft end support arrangement for the propellant grain can be grave threats to the integrity of the propellant grain. Indeed, at acceleration levels typical of gun launches, neither the bonded circumferential surface of an axially perforated propellant grain nor an unperforated grain with a bonded forward end is stiff enough to eliminate the aft end support mode unless there is a great deal of empty space within the motor.

It follows that virtually the entire force that accelerates the propellant grain during gun launch is applied by direct bearing through its aft end. It also follows that the circumferential surface of the propellant grain will expand to fill the cylinder, imposing a radial pressure varying with depth (hydrostatically) from the aft end to the forward end.

Therefore, during gun launch, the case cylinder usually experiences tension in the hoop direction due to internal pressure applied by the propellant. This internal pressure may well be several times larger than the operating pressure later in flight when the propellant burns. Moreover, during gun launch, the axial force needed to accelerate the payload located forward of the rocket motor is carried around the propellant grain by axial compression in the rocket motor case, which should be proportioned so that buckling does not occur.

The buckling load for an axially compressed thin cylinder depends on its radius, thickness and length, and upon the modulus of elasticity at the actual imposed effective stress level. When the material "yields," the modulus decreases from the initial value, Young's modulus, to zero eventually (for ductile metals). Effectively, the material yields under the mixed tension and compression condition at a far lower stress level than if either stress were acting alone, and the modulus of elasticity—and the buckling load—are thereafter much reduced. Thus, the thickness needed to assure a suitable safety factor is expected to be much higher than would be deduced for either the internal pressure or axial force alone.

In recent years, efforts to overcome the above-described behaviors of both the propellant and the case cylinder have turned to admitting the gun pressure to the interior of the rocket motor case. Examples of this approach are disclosed in U.S. Pat. No. 3,349,708, and are also explained in detail in U.S. Pat. No. 6,094,906. Admitting the gun pressure to the interior of the rocket motor with the fluid void-filler has both obvious and subtle implications. Among the obvious is that unless the exterior surface of the rocket motor is also exposed to gun pressure, the case cylinder may have to accommodate as much as 60,000 psi internal pressure, or more—an order of magnitude above the usual range of rocket motor operating pressures. To expose the external surface to pressure, an obturator, which is a sliding seal between the projectile and the gun tube that prevents the gun pressure from escaping around the projectile, is moved from the aft to the forward end of the rocket motor. It follows that, for the quasi-static situation at maximum acceleration, the differential pressure across the case cylinder wall is external pressure of varying magnitude, reflecting the hydrostatic gradient in the propellant grain. Further, the axial compression in the case cylinder disappears because the accelerating force for the payload is applied directly to the forward closure.

The subtle implications reflect the dynamic situations as the gun pressure rises rapidly upon ignition and as the gun pressure disappears when the obturator passes out of the gun bore. At the outside, because the orifice into the rocket motor is quite small, the intensity of the gun pressure applied to its interior lags the pressure intensity applied to the exterior. This threatens to buckle the case if the duration of the lag is large enough. Also when the obturator clears the gun bore, the small nozzle orifice prevents an instantaneous drop of internal pressure after the external pressure disappears. This threatens to burst the case unless it has been made thick enough to withstand the gun pressure level—acting alone—that prevails immediately before the obturator clears the gun bore.

Given usual propellants and rocket motor nozzles, greater range or velocity is achieved for the projectile by configuring the rocket motor such that it can hold a maximum amount of propellant. However, the outside diameter, and hence the available volume for propellant, of gun-launched rocket motors is limited by the size of the gun bore from which the rocket motors are fired.

The volume of propellant in gun-launched rocket motors is maximized when the interior diameter of the rocket motor case cylinder is maximized by making the case cylinder as thin as possible. However, the case cylinder should be designed thick enough to withstand gun-launched loads and, when gun pressure is allowed within the case cylinder, the pressure differentials between the inside and outside of the case cylinder. The case cylinder should further be designed to withstand pressure differentials not only at maximum levels, but as the gun pressure rises early during launch and falls as the rocket motor exits the gun bore. Rocket motors designed according to the prior art must therefore survive gun launch loadings that are frequently far more severe than the later loadings during rocket motor bum. This may require thicker structures which diminish the volume available for propellant, and which increase the inert weight of the motor, thereby diminishing the attainable range or velocity of the projectile.

Thus, an advancement over the prior art would be achieved by introducing rocket motor configuration features that diminish the net loads that the rocket motor case cylinder must be designed to withstand during gun launch, thereby diminishing the inert weight and increasing the available propellant volume while also providing an insensitive munitions system that is effective against slow cook-off conditions.

Such rocket motor configuration features are disclosed and claimed herein.

BRIEF SUMMARY OF THE INVENTION

This invention provides a rocket motor having an insensitive munitions system that is capable of passing a slow cook-off test.

This invention also addresses the above advancement by providing a gun gun-launched rocket motor designed to diminish the net loads that the rocket motor case experiences during gun launch, reduce the inert weight and increase the available propellant volume, and provide an insensitive munitions case and closure design.

This invention further provides a rocket motor design that accommodates size variations of the solid propellant as temperature conditions vary, such as while the rocket motor is being transported or stored, and incorporates in the insensitive munitions capability.

This invention still further provides a projectile having a rocket motor.

Several exemplary embodiments of the invention are disclosed and claimed herein.

In accordance with the present invention as embodied and broadly described herein, a rocket motor according to a first aspect of this invention has insensitive munitions capability. The rocket motor comprises a case including a cylindrical region, a closed forward end, and an aft assembly, the aft assembly comprising an aft closure member provided with an opening, the case being rupturable at an internal pressure burst level. The rocket motor further comprises a nozzle assembly coupled to the case, the nozzle assembly comprising a nozzle passageway. A primary propellant grain is contained in the case and has an auto-ignition temperature at which the primary propellant grain auto-ignites. The primary propellant grain is formulated to undergo thermal expansion in response to being heated to temperatures below the auto-ignition temperature so as to fill free volume, if any, inside the case and to apply an internal pressure to the case that is less than the internal pressure burst level. An igniter assembly is operational between an inactive state and an activated state. In the inactive state, the nozzle passageway is obstructed to substantially prevent the flow of combustion gases through the central nozzle passageway. In the activated state, the igniter assembly ignites the primary propellant grain and the nozzle passageway is substantially unobstructed to permit flow through the central nozzle passageway for propelling the rocket motor. An insensitive munitions charge is located inside the case and has an insensitive munitions auto-ignition temperature at which the insensitive munitions charge auto-ignites to release gas. The insensitive munitions auto-ignition temperature is below the primary propellant auto-ignition temperature. The insensitive munitions charge is present in an effective amount such that the gas released by auto-ignition of the insensitive munitions charge combines with the internal pressure applied by the thermal expansion of the primary propellant grain when the igniter assembly is in the inactive state to raise the internal pressure inside the case above the internal pressure burst level for rupturing the case before the primary propellant grain reaches the auto-ignition temperature thereof In accordance with the present invention as embodied and broadly described herein, a rocket motor according to a second aspect of the invention comprises a rupturable case including a cylindrical region, a closed forward end, and an aft assembly. The aft assembly comprises an aft closure member provided with an opening. A nozzle assembly is coupled to the case and comprises a nozzle passageway and a throat-barrier member for obstructing the nozzle passageway. A primary propellant grain is contained in the case, has an auto-ignition temperature, and is formulated to undergo thermal expansion in response to being heated within a range of temperatures below the auto-ignition temperature. As the primary propellant grain thermally expands, it will substantially fill free volume, if any, inside the case and apply an internal pressure to the case that is less than the internal pressure burst level at which the case will rupture. An igniter assembly is positioned in the nozzle assembly and is operational between an inactive state and an activated state. In the inactive state, the igniter assembly is situated in the nozzle passageway and the throat-barrier member obstructs the nozzle passageway for substantially preventing the flow of gases through the nozzle passageway. In the activated state, the igniter assembly ignites the primary propellant grain, causing the nozzle passageway to become substantially unobstructed by the throat-barrier member and permitting the flow of gases through the nozzle passageway. The rocket motor of this aspect of the invention further comprises an insensitive munitions charge located inside the case and having an insensitive munitions auto-ignition temperature at which the insensitive munitions charge auto-ignites to release gas. The insensitive munitions auto-ignition temperature is below that of the primary propellant auto-ignition temperature. The insensitive munitions charge is present in an effective amount such that the gas released by auto-ignition of the insensitive munitions charge combines with the internal pressure applied by the thermal expansion of the primary propellant grain to raise the internal pressure inside the case above the internal pressure burst level. Because the igniter assembly is in the inactive state and the nozzle passageway is obstructed during insensitive munitions operation, the internal pressure cannot escape through the nozzle passageway and the internal pressure builds to rupture the case. Further, because the insensitive munitions auto-ignition temperature is below that of the primary propellant grain, rupturing of the case occurs before the primary propellant grain reaches its auto-ignition temperature. Thus, if the primary propellant grain is eventually ignited or auto-ignited, gases thereby generated will be able to escape the case through the ruptured portion of the case without producing significant propulsive forces.

In currently preferred embodiments, the first and second aspects of the invention provide a rocket motor having an insensitive munitions system that is capable of passing a slow cook-off test. Because there is no or substantially no free volume inside of the rocket motor and much of the pressure is produced by the expanding propellant grain, the insensitive munitions charge may be small and the quantity of gas it produces may be relatively small. Therefore, the case rupture resembles a hydroburst, not a gas burst.

In accordance with the present invention as embodied and broadly described herein, a rocket motor according to a third aspect of this invention comprises a case that is rupturable at an internal pressure burst level and includes a cylindrical region, a closed forward end, and an aft assembly. The aft assembly comprises an aft closure member provided with a central opening. A sliding piston is slidably retained within the aft assembly and the cylindrical region of the case so as to be movable from an at-rest position forward to a maximum pressure position in which the primary propellant grain is axially compressed to radially expand toward the cylindrical region of the case in response to firing of the rocket motor. The sliding piston is also slidable aftward in response to expansion of the primary propellant grain caused by elevated external temperatures. A nozzle assembly is slidably mounted within a central bore of the sliding piston to slide in tandem with the sliding piston. The nozzle assembly comprises a central nozzle passageway and a throat-barrier member for obstructing the central nozzle passageway. A primary propellant grain is contained in the case and has an auto-ignition temperature at which it auto-ignites. The primary propellant grain is formulated to undergo thermal expansion in response to external heat sources below the auto-ignition temperature. As the primary propellant grain thermally expands, it substantially fills free volume, if any, inside the case and applies an internal pressure to the case that is less than the internal pressure burst level. An igniter assembly is positioned within the nozzle assembly and operational between an inactive state and an activated state. In the inactive state, the igniter assembly is situated in the central nozzle passageway and the throat-barrier member obstructs the central nozzle passageway for substantially preventing flow through the central nozzle passageway. On the other hand, in the activated state the igniter assembly ignites the primary propellant grain and the central nozzle passageway is substantially unobstructed by the throat-barrier member to permit flow through the central nozzle passageway. An insensitive munitions charge is located inside the case and has an insensitive munitions auto-ignition temperature at which the insensitive munitions charge auto-ignites to release gas, the insensitive munitions auto-ignition temperature being below the primary propellant auto-ignition temperature. The insensitive munitions charge is present in an effective amount such that the gas released by auto-ignition of the insensitive munitions charge produces additional internal pressure inside the case. The internal pressure applied by the insensitive munitions charge combines with the internal pressure applied by the thermal expansion of the primary propellant grain to raise the total internal pressure inside the case above the internal pressure burst level. Because the igniter assembly is in the inactive state and the flow of gases through the central nozzle passageway is substantially prevented, the total internal pressure generated by the combination of the thermal expansion of the primary propellant grain and gases released by the insensitive munitions charge reaches the internal pressure burst level and causes the case to rupture. Case rupture occurs before the primary propellant grain reaches the auto-ignition temperature thereof. As a consequence, if the primary propellant grain eventually reaches its auto-ignition temperature or is otherwise ignited, gases produced by the primary propellant grain will be able to escape the case through the rupture in a relatively safe manner.

In accordance with this third aspect of the invention, the interior environment-controlled movable piston accommodates volume changes due to propellant thermal expansion and accommodates the substantial gun pressures associated with gun-launched projectiles. This enables a rocket motor structure design with the ability to withstand a dramatic rapid rise and dramatic sudden fall in pressure associated with gun-launched rockets. The movable piston also permits the rocket motor to be constructed from thinner and lighter materials to increase the available propellant volume and reduce overall inert weight. As a consequence, the range and effectiveness of the rocket motor are increased. Simultaneously, the rocket motor incorporates IM capability to permit the rocket motor to be rendered relatively harmless should the solid propellant inappropriately ignite while being stored or transported.

In accordance with a fourth aspect of this invention, the rocket motor comprises a primary insensitive munitions charge and a secondary insensitive munitions charge. The secondary insensitive munitions charge is formulated to have an auto-ignition temperature below the auto-ignition temperature of the propellant grain yet higher than the auto-ignition temperature of the primary insensitive munitions. The secondary insensitive munitions charge is preferably located in close proximity to the end burn surface of the primary propellant grain, so that auto-ignition of the secondary insensitive munitions charge in turn ignites the end burn surface of the primary propellant grain. As a consequence, the primary propellant grain will begin to burn from its end surface (where intended) before the primary propellant grain reaches its auto-ignition temperature. Thus, a significant portion or all of the primary propellant grain will be consumed by controlled burning at its end surface prior to auto-ignition of the primary propellant grain. Also, because the secondary insensitive munitions charge is designed to auto-ignite after the primary insensitive munitions charge, the case should already have burst (i.e., vented) by the time the secondary insensitive munitions charge auto-ignites.

BRIEF DESCRIPTION OF THE SEVERAL VIEWS OF THE DRAWINGS

The accompanying drawings are incorporated in and constitute a part of the specification. The drawings, together with the general description given above and the detailed description of the preferred embodiments and methods given below, serve to explain the principles of the invention. In such drawings.

DETAILED DESCRIPTION OF THE INVENTION

Reference will now be made in detail to the presently preferred embodiments and methods of the invention as described below. It should be noted, however, that the invention in its broader aspects is not limited to the specific details, representative devices and methods, and examples described in this section in connection with the preferred embodiments and methods. The invention according to its various aspects is particularly pointed out and distinctly claimed in the attached claims read in view of this specification and appropriate equivalents.

It is to be noted that, as used in the specification and the appended claims, the singular forms "a," "an," and "the" include plural referents unless the context clearly dictates otherwise.

Figure 1:
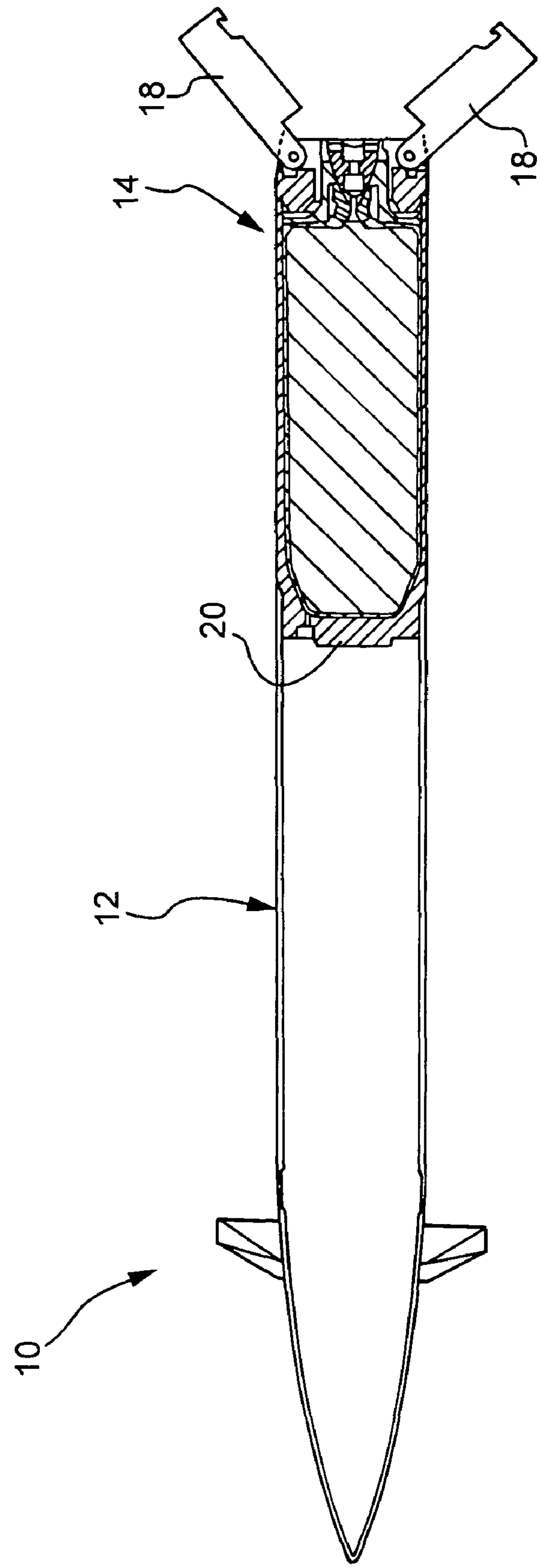
FIG. 1 illustrates a projectile incorporating a rocket motor according to a presently preferred but merely illustrative embodiment of the present invention, the rocket motor being shown in cross-sectional view.

FIG. 1 shows a projectile, generally designated by reference numeral 10, that includes a forward end 12 that can contain some payload, such as, for example, a guidance system and/or an explosive charge, and an aft rocket motor, generally designated by reference numeral 14. Included at the aft end are fins 18 shown as being pivotally attached to the rearmost portion of the rocket motor 14. The projectile 10 is designed to be launchable by a gun or other similar weapon.

Figure 2:
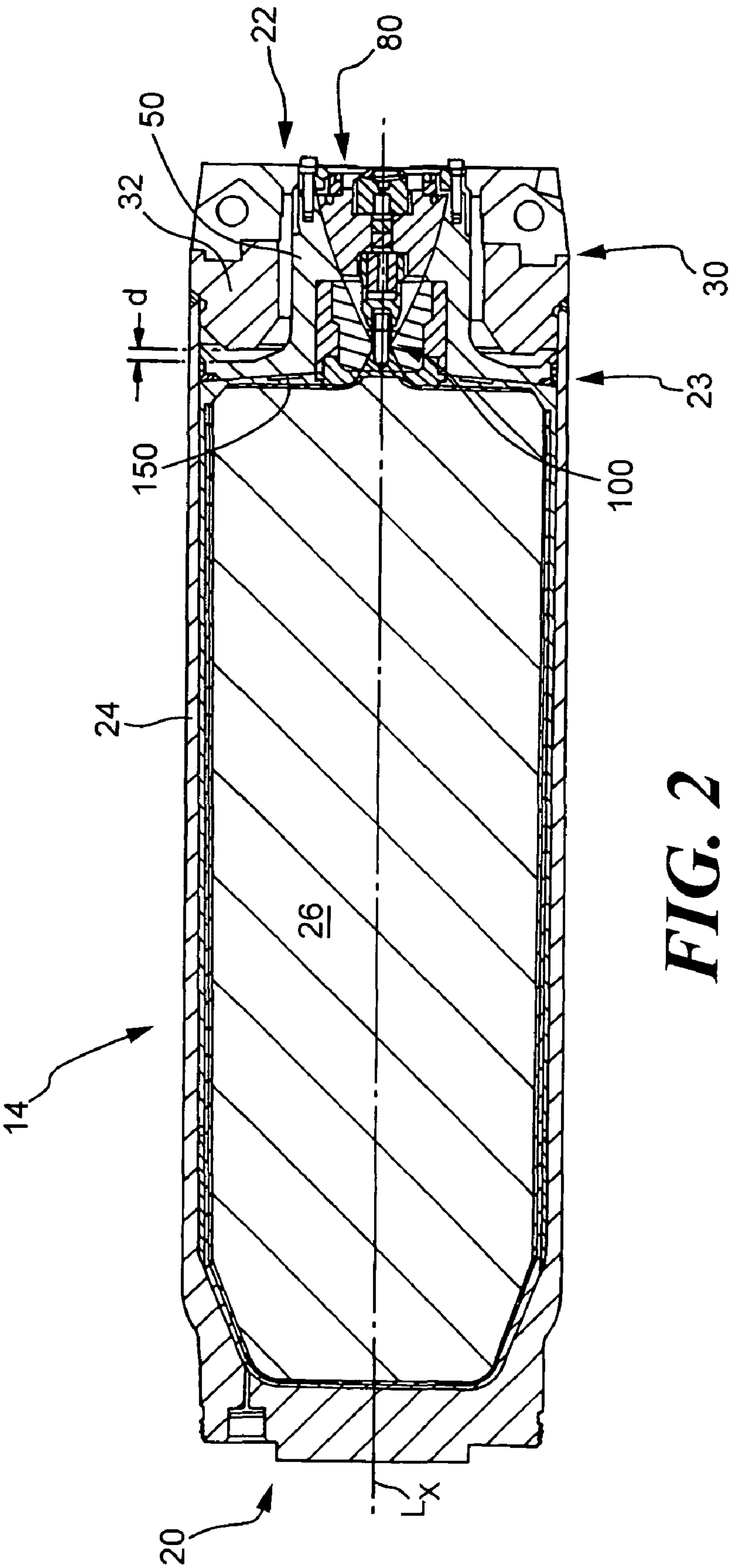
FIG. 2 is a cross-sectional view of an embodiment of the rocket motor of the present invention, depicting the rocket motor in an at-rest condition.
Figure 3:
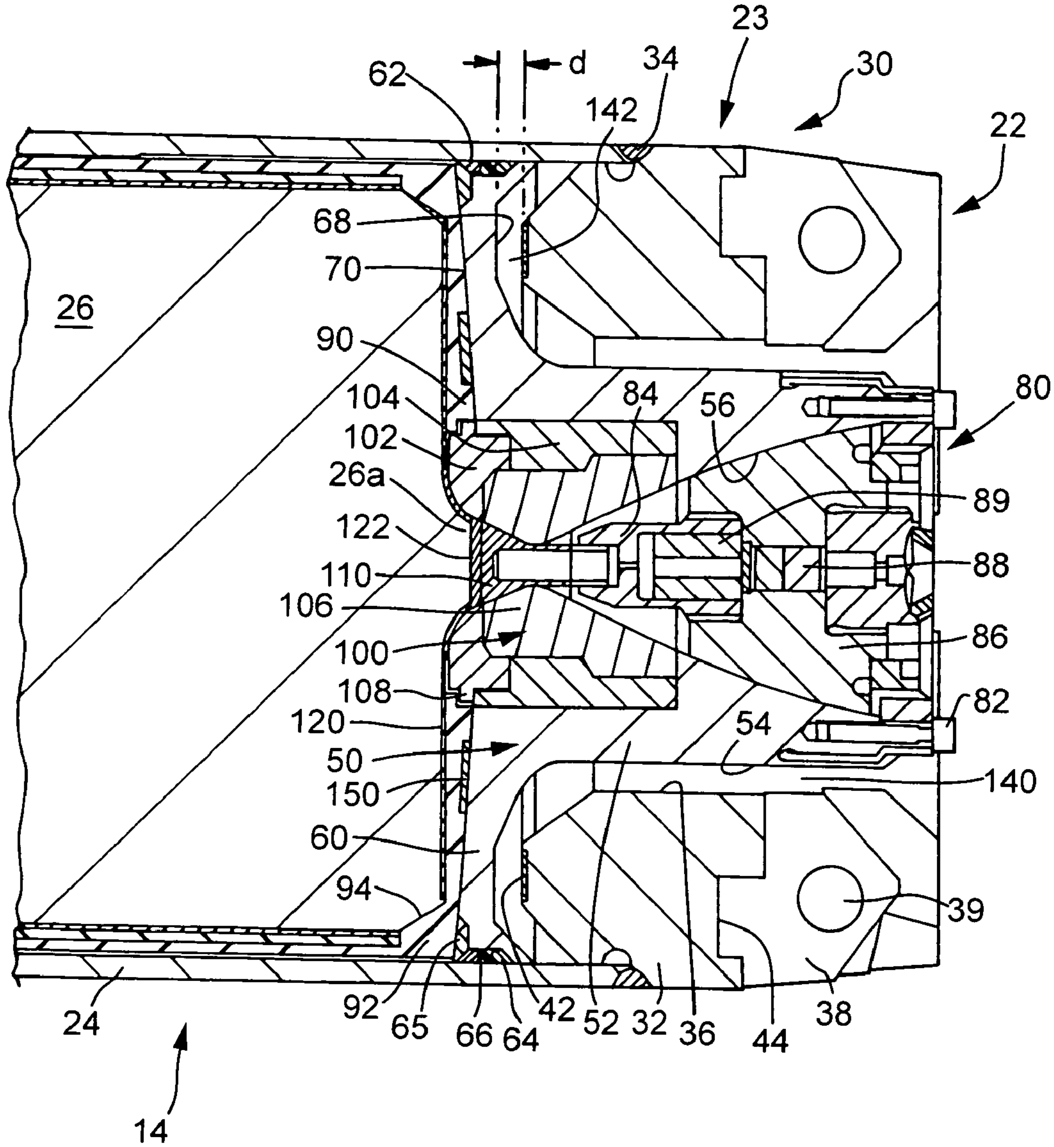
FIG. 3 is an enlarged cross-sectional view of the aft closure assembly, sliding piston, nozzle assembly, and igniter assembly of the rocket motor of FIG. 2, depicting the rocket motor in an at-rest condition.

FIGS. 2 and 3 show the rocket motor 14 in an at-rest position and, in particular, an enlarged view of a portion of the aft end is shown in FIG. 3. The rocket motor 14 is generally symmetrical about longitudinal axis Lx. The rocket motor 14 includes a forward end closure 20, an aft end generally designated by reference numeral 22, and an outer case 23 having a cylindrical portion 24 that contains a propellant or propellant grain 26. The case 23 is preferably made of a metal such as steel, although other materials such as a composite material (e.g., wound pre-impregnated fibers) may be used. The propellant grain 26 preferably has a primary propellant auto-ignition temperature of about 460° F. (about 238° C.). Suitable propellant grains 26 comprise composite propellants containing an ammonium perchlorate oxidizer, aluminum fuel, and hydroxyl terminated polybutadiene binder, as well as additional optional materials such as titanium dioxide ballistic modifiers. Double-base propellants may also be used as the propellant grain 26. These examples are intended to be representative, not exhaustive, of the scope of application of this invention.

As shown in FIG. 3, an aft closure assembly, generally indicated by reference numeral 30, includes an aft closure member 32 mounted within and welded at 34 to the aft end of the cylindrical portion 24 of the case 23. The aft closure member 32 is provided with an internal cylindrical bore 36 and has a forward surface 42 and an aft surface 44. The forward surface 42 may optionally include a rubber seal. The flight control fins are rotatably mounted to fin lugs 38 by pin 39. In this manner, the fins mounted in the fin lugs 38 can deploy by swinging outwardly and the fin lugs 38 can spin, as is both necessary and appropriate, once the rocket leaves the bore of the launch weapon.

Located inboard of the aft closure member 32 is a sliding piston 50. The sliding piston 50 includes a main cylindrical body 52 having an external or outer surface 54, an internal chamber (unnumbered), and a sloping interior rear surface 56. An igniter assembly 80 may be fixed to the interior rear surface 56 by, for example, conventional techniques. For example, in the illustrated embodiment, frangible bolts 82 connect the igniter assembly 80 to the sliding piston 50. The bond between the igniter assembly 80 and the sloping interior rear surface 56 of the sliding piston 50 is provided by a conventional soft and frangible adhesive, thereby making this bond one that can break and yield.

Included as part of the igniter assembly 80 are a forward nozzle 84 and a main body 86, which contains a conventional igniter charge 89 in operative communication with a conventional time delay ignition train 88 positioned aft of the nozzle 84. Operation of the igniter assembly 80 during normal launch of the rocket motor, as well as the part that the igniter assembly plays in the IM system of this embodiment, will be described in further detail below.

The sliding piston 50 includes an annular flange 60 that extends radially outwardly from the main cylindrical body 52 to slidingly engage the inner surface of the cylindrical portion 24 of the case 23. Three seal components including outboard aluminum rings 62 and 64 and a centrally positioned rubber O-ring 66 are used at the interface of the flange 60 and the cylindrical portion 24 of the case 23. The aluminum rings 62 and 64 are provided to maintain the integrity of the O-ring 66 and to keep the O-ring 66 from extruding during movement of the sliding piston 50. These seal components are also situated at the outer periphery of the flange 60 to provide sliding contact between the outer periphery of the flange 60 and the internal surface of the cylindrical portion 24 of the case 23. Pressure imparted by the gun gases cause the sliding piston 50 to move forward, thus moving the flange 60 relative to the cylindrical portion 24 of the case 23. These seal components also serve similar functions as the piston moves aftward during IM activation, that is, from a position shown in FIG. 2 to that shown in FIG. 6. A retaining ring 65 is positioned forward of the seal components and serves to retain the seal components between the outer periphery of the flange 60 and the internal surface of the cylindrical portion 24 of the case 23. The retaining ring 65 may be made of, for example, steel.

The radially extending flange 60 has a rear or aft surface 68 and a forward surface 70. The aft surface 68 of the flange 60 is spaced from the forward surface 42 of the aft closure member 32 by a cavity 142. This cavity 142 has a depth d and, as explained in further detail below, the depth d will vary over the course of rocket motor firing and insensitive munitions activity.

A tapered rubber insulator 90 is mounted to the forward surface 70 of the flange 60. Optionally, a hard plastic insulator (not shown) may be mounted between the forward surface 70 and the tapered rubber insulator 90. The tapered rubber insulator 90 is characterized by a tapered cross section that has its largest dimension adjacent to a nozzle assembly, which is generally designated by reference numeral 100. The tapered rubber insulator 90 tapers down to its smallest dimension at a point where the insulator 90 is formed with a triangularly shaped corner portion 92, which has an interior angle surface 94. The tapered rubber insulator 90 may be made, for example, of an EPDM rubber composition.

The nozzle assembly 100 comprises an annular forward nozzle insulator 102 and an annular aft nozzle insulator 104. The forward and aft nozzle insulators 102 and 104 are adhesively bonded to each other and an annular throat insert 106, which is centrally and concentrically located relative to the insulators 102 and 104. The forward and aft nozzle insulators 102 and 104 are provided with a tongue and groove interlocking structure, as generally shown at 108. The throat insert 106 may be made of a refractory metal, such as tungsten, rhenium, or alloys thereof. The throat insert 106 has an area of minimum cross-sectional dimension, known as the nozzle throat.

The front end of the igniter assembly 80 protrudes towards the nozzle throat. Located forward of the igniter assembly 80 is a throat-barrier member 110, which in the illustrated embodiment is an eroding (e.g., steel) nozzle piece. It is to be understood, however, that the nozzle throat-barrier member 110 may undertake other forms consistent with the objects of this invention, and may even constitute part of the igniter assembly 80.

Figure 4:
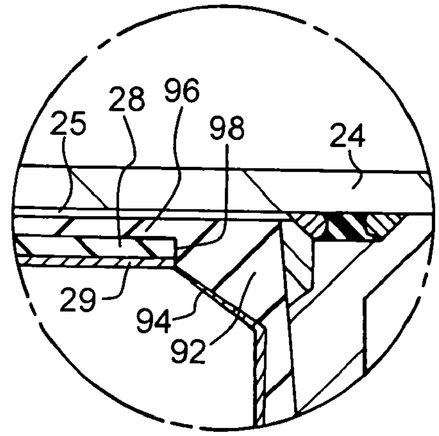
FIG. 4 is an enlarged cross-sectional view of a portion of FIG. 3.

As shown in FIG. 4, the cylindrical portion 24 of the case 23 serves as the outer container of the rocket motor 14. Inboard of the interior of the cylindrical portion 24, and forward of the aluminum ring 62 (FIG. 3), is an annular void space 25. Inboard of the void space 25 is an annular extension 96 of the tapered rubber insulator 90. The extension 96 extends from the triangularly shaped corner portion 92 to the forward end closure 20 (FIG. 1). A shoulder 98 is formed at the interior side of the triangularly shaped corner portion 92. Mounted on the shoulder 98 and inboard of the extension 96 is a cylindrical rubber-type insulator 28 with a polymer or similar type liner 29. The liner 29 covers and extends around the outer surface of the propellant grain 26 (FIG. 1) forward of the angled surface 94 and bonds the propellant grain 26 to the insulator 28. If desirable, adhesive may be placed on the interior surface of the liner 29 for strengthening this bond.

It should be understood that the exact materials used to surround and insulate the propellant grain 26, and their arrangement and dimensions may vary depending upon the type of propellant used. These elements will be known to those skilled in the art.

A rubber sheet nozzle insulator 120 extends from an outer periphery adjacent the angled surface 94, which lies unbonded adjacent the propellant grain 26. The rubber sheet nozzle insulator 120 has a forward surface that contacts and extends across the aft end of the propellant grain 26, including a central nipple 26*a* of the propellant grain 26 that protrudes towards the nozzle throat. The aft surface of the rubber sheet nozzle insulator 120 is suitably bonded to and extends along the forward surface of the tapered rubber insulator 90 and the forward face of the forward nozzle insulator 102. An inhibitor portion 122 passes across the nozzle passageway forward of the throat-barrier member 110. The inhibitor portion 122 may be formed, for example, from liquid rubber that is poured in place and cures at room temperature. Techniques for bond surface preparation and the selection of suitable adhesive formulations, compatible with the propellant and insulator materials, are well known to those skilled in the art.

Interposed between the nipple 26*a* and the rubber sheet nozzle insulator 120 is a forward aluminum plate (not shown). In operation, the aluminum plate prevents the pressurized propellant grain 26 from extruding through the throat-barrier member 110.

An insensitive munitions charge 150 is illustrated positioned in an annular recess of and contacting the tapered rubber insulator 90, with an aft surface of the insensitive munitions charge 150 positioned flush against the forward surface 70 of the flange 60. Although shown having an annular shape, the insensitive munitions charge 150 may have other shapes and An insensitive munitions charge 150 is illustrated positioned in an annular recess of and contacting the tapered rubber insulator 90, with an aft surface of the insensitive munitions charge 150 positioned flush against the forward surface 70 of the flange 60. Although shown having an annular shape, the insensitive munitions charge 150 may have other shapes and be located at other positions. For example, the insensitive munitions charge 150 may comprise a plurality of distinct charges circumferentially spaced apart from each other. Other suitable locations for the insensitive munitions charge 150 include, for example, adjacent to the extension 96. The insensitive munitions charge 150 is preferably an energetic material. Representative insensitive munitions charges 150 include, by way of example, rocket propellants, such as dihydroxyglyoxime propellants, hydroxy-terminated polyethers, and TPGE (a random 50:50 copolymer of polytetrahydrofuran and polyethyleneglycol, available from Alliant Techsystems Inc.) propellants. These examples are meant to be an illustrated list and not exhaustive of the scope of the invention. Preferably, the insensitive munitions charge 150 has an insensitive munitions auto-ignition temperature that is at least 100° F. (56° C.) below the auto-ignition temperature of the primary propellant grain 26.

With reference to FIG. 3, it can be noted that an annular gap 140 is defined between the external surface 54 of the sliding piston 50 and the internal bore 36 of the aft closure member 32. During normal operation, the rocket motor 14 will be launched, preferably from a launch weapon, as discussed previously. As a result of such a gun launch, and as gun gases are generated within the bore of the gun by the gun propellant (not shown) aft of the rocket motor 14, such gun gases will enter annular gap 140 and strike against and pressurize the aft surface 68 of the flange 60. The imposing of such axial forces on the sliding piston 50 moves the sliding piston 50 from an at-rest position forward toward and ultimately to a maximum pressure position. As the sliding piston 50 is moved forward, the depth d of the cavity 142 between the aft surface 68 of the flange 60 and the forward surface 42 of the aft closure member 32 is increased. As the sliding piston 50 moves forward to increase the size of the cavity 142, the outer edge of the flange 60 slides along the inside surface of the cylindrical portion 24, guided by seal components such as rings 62, 64, and 66. The axial force on the flange 60 of the sliding piston 50 is transmitted through the tapered rubber insulator 90, compressively loading the propellant grain 26 and causing the propellant grain 26 to deform radially to fill the void space 25. Similar type movement of a sliding piston is disclosed and illustrated in U.S. Pat. No. 6,094,906 to Singer et al.

As the gun launch concludes, gun gases that entered the rocket motor 14 through the annular gap 140 will depart through that same annular gap 140 and forces acting on the aft surface 68 of the flange 60 (through cavity 142) will progressively lessen. Compressive forces previously acting on the propellant grain 26 will likewise progressively decrease, and as these forces decrease, pressures interior and exterior to the case 23 will also progressively decrease. As a consequence, the case 23 will have been able to tolerate the rise and fall of interior and exterior pressures associated with gun launching.

As forces decrease, the axial force acting to compress the tapered rubber insulator 90 also lessens, allowing the insulator 90 to return to its uncompressed condition. As the tapered rubber insulator 90 returns to its former thickness, such movement will initiate aftward movement of the sliding piston 50 toward the aft closure member 32 and separate the bond provided between the propellant grain 26 and the forward surface of the rubber sheet nozzle insulator 120. This separation provides a path for burn propagation during normal ignition that will follow. The aft surface of the rubber sheet nozzle insulator 120 remains adhered to most of the forward face of the forward nozzle insulator 102. At this point, the propellant grain 26 is ready to be ignited for a normal burn.

The gun gases initiate burn of the time delay ignition train 88 within the igniter assembly 80, so that at a desired interval after the projectile leaves the bore of the launch weapon, an igniting flame passes from the igniter assembly 80 through inhibitor portion 122 and into contact with the propellant grain 26. When this occurs, the rubber sheet nozzle insulator 120 will be adhered to the forward surface of the forward nozzle insulator 102. With this connection, normal burning of the propellant grain 26 can proceed on the forward side of the rubber sheet nozzle insulator 120.

Figure 5:
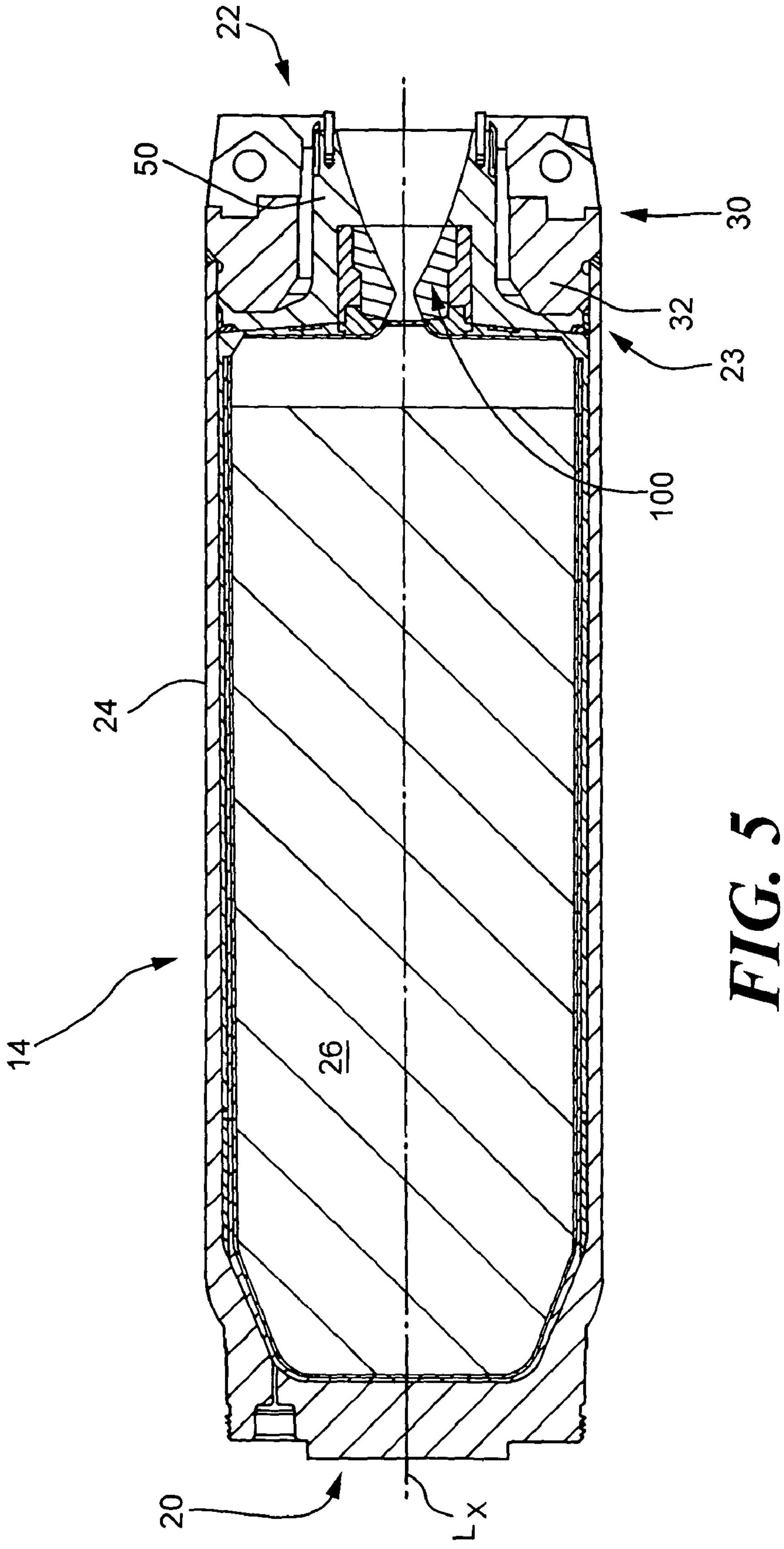
FIG. 5 is a cross-sectional view of the rocket motor of FIG. 2, depicting the rocket motor in an activated state during normal burn.

As the propellant grain 26 is ignited by the igniter assembly 80, the throat-barrier member 110 is eroded or otherwise substantially removed or jettisoned by activation of the igniter assembly 80 and/or burning of the propellant grain 26. Burning of the propellant grain 26 causes the sliding piston 50, together with the attached nozzle assembly 100, to slide aftward until the aft surface 68 of the flange 60 contacts the forward surface 42 of the aft closure member 32, as shown in FIG. 5. As propelling forces begin to rise, heat and pressure build within the nozzle assembly 100. Due to the frangible nature of the bond holding the igniter assembly 80 in place, such pressures will also break that bond, thereby expelling the igniter assembly 80 from the nozzle passageway. FIG. 5 illustrates the rocket motor 14 after the igniter assembly 80 has been ejected.

Although not shown, an obturator may be used at the forward end of the rocket motor 14. In conjunction with the internal compression chamber, the obturator provides a way to minimize the differences between internal and external pressures which vary rapidly as the rocket progresses down the gun bore. Moreover, nearly the full gun pressure applied to the inner surface of the forward closure provides the accelerating force for the payload farther forward. The axial force in the case cylinder is reduced to merely the low level required to accelerate the rear closure and other features farther aft, acting in axial tension. The present invention may be constructed and designed so that the material used for the structure, preferably an 18 Ni 300 Maraging Steel, will have sufficient capacities, for thicknesses of the parts used, to resist all imposed loadings with ample safety margins, thereby providing effective structure for the rocket motor.

Figure 6:
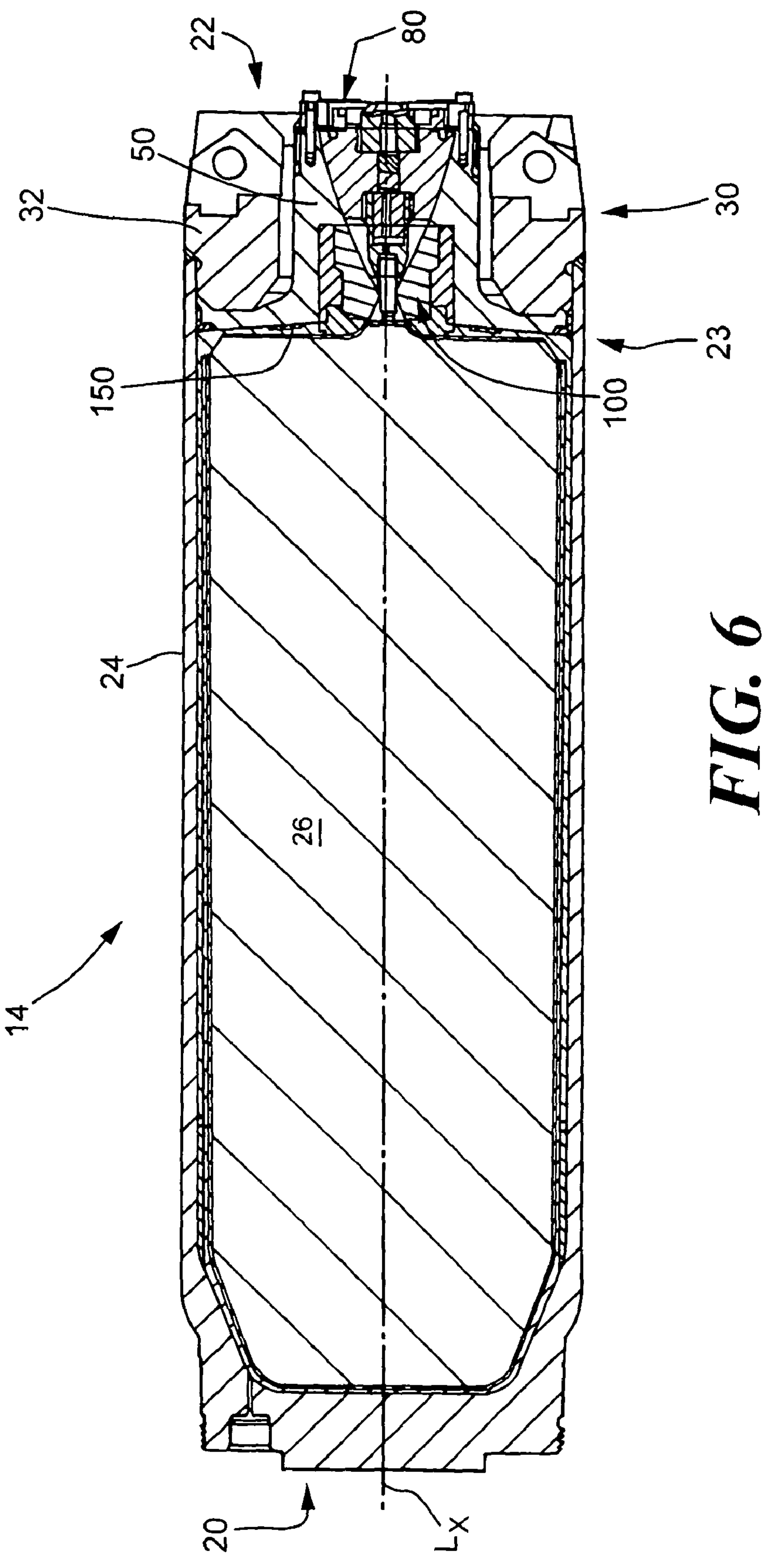
FIG. 6 is a cross-sectional view of the rocket motor of FIG. 2, depicting an insensitive munitions condition of the rocket motor during propellant expansion caused by elevated external temperatures.

The structural features described above also allow this rocket motor design to satisfy certain insensitive munitions (IM) requirements that help assure safe storage. How this system operates will now be described and the foregoing IM protection will become clear. In an abnormal burn or ignition situation, such as could occur due to external case heating, it is proposed that the primary propellant grain 26 begins to heat and thermally expand. In a particularly preferred aspect of the invention, the propellant thermal expansion temperature range is selected to fill the free volume of the case 23, including the void 25, with the primary propellant grain 26 at about 150° F. (66° C.). As the primary propellant grain 26 continues to undergo thermal expansion, it applies an internal pressure to the case 23 because the propellant grain 26 cannot extrude through the nozzle. Simultaneously, the sliding piston 50 slides aftward until the rear surface of the flange 60 abuts against the forward surface 42 of the aft closure member 32. In this manner, the cavity 142 will progressively lessen in size until reaching the state shown in FIG. 6. In FIG. 6, the arrow represents the location at which the cavity 142 had been located.

As external heating of the rocket motor 14 continues, thermal expansion of the propellant grain 26 continues to increase and apply internal pressure to the case 23. Eventually, if the insensitive munitions charge 150 reaches its auto-ignition temperature, which is preferably no more than about 360° F. (about 181° C.), the insensitive munitions charge 150 auto-ignites to release gas into the internal chamber of the rocket motor 14. In a particularly preferred embodiment, the internal pressure released by auto-ignition of the insensitive munitions charge 150 is not more than 25 percent of the internal pressure applied by the thermal expansion of the primary propellant grain 26. The internal pressure exerted by both the thermal expansion of the primary propellant grain 26 and the gas generation of the insensitive munitions charge 150 is designed to be greater than the internal pressure burst level of the case 23. The throat-barrier member 110 prevents the escape of this pressure through the nozzle passageway. As a result, the case 23 will burst. Because the auto-ignition temperature of the insensitive munitions charge 150 is less than preferably at least 100° F. (56° C.) less than the auto-ignition temperature of the propellant grain 26, the insensitive munitions charge 150 will auto-ignite to release gas and the case 23 will burst before the primary propellant grain 26 auto-ignites. As a result, the burst is achieved mostly by the pressure generated by the thermal expansion of the propellant grain 26, causing the burst to resemble a hydroburst, not a gas burst. Hence, the case 23 fails, while preferably not producing propulsive fragments. In the event that the primary propellant grain 26 eventually does auto-ignite or is ignited, gases generated by the primary propellant grain 26 may be discharged through the burst case without generating significant or any propulsive forces.

As referred to herein, bursting of the case 23 means sufficient structural failure to open a vent gas (other than the central nozzle passageway) through which accumulated gas may be vented to the atmosphere safely without creating significant propulsive force. Bursting of the case 23 may include, for example, structural failure of the cylindrical portion 24, such as the formation of cracks in the cylindrical portion 24 of the case 23, or structural failure of the aft closure assembly 30 or sliding piston 50. Additionally or in the alternative, bursting of the case may include, for example, failure of case joints, such as failure of the weld 34 coupling the cylindrical portion 24 to the aft closure member 32. Failure of weld 34 will likely cause the aft closure member 32, the sliding piston 50, the nozzle assembly 100, and the igniter assembly 80 to eject as a unit. Thereafter, the exhaust area available for expulsion of gases will be sufficiently large that the propulsive force will be quite small.

In this manner, the IM requirement of having a safety release capability built into the rocket motor is achieved. The aft side venting assures that the gases resulting from an abnormal propellant burn will not pass through the nozzle throat.

Figure 7:
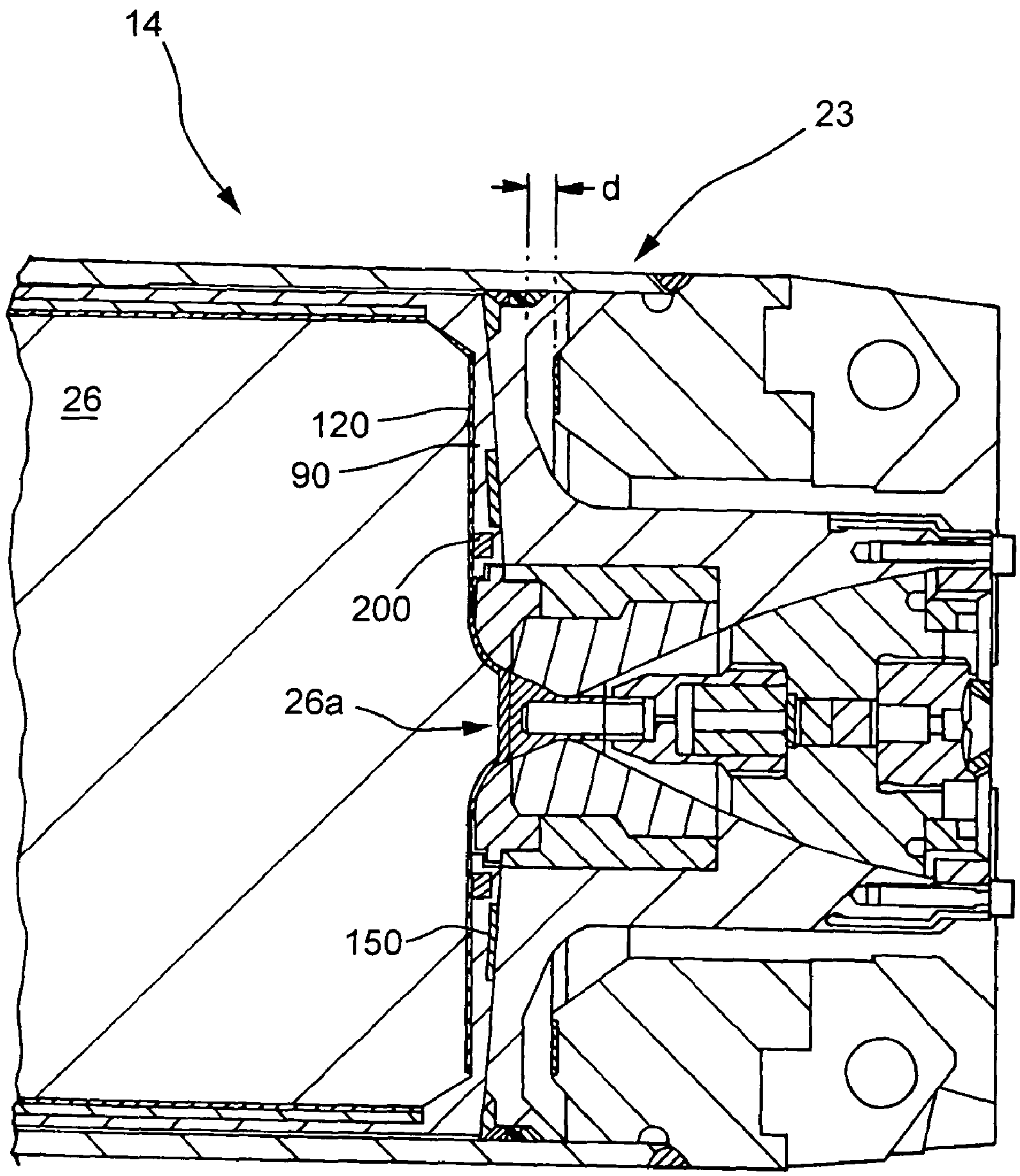
FIG. 7 is an enlarged cross-sectional view of the aft closure assembly, sliding piston, nozzle assembly, and igniter assembly of a rocket motor in an at-rest condition in accordance with another embodiment of the invention.

Another embodiment of this invention will now be discussed with reference to FIG. 7. In this embodiment, the insensitive munitions charge 150 is a primary insensitive munitions charge, and the rocket motor 14 further comprises a secondary insensitive munitions charge 200. The secondary insensitive munitions charge 200 has an auto-ignition temperature below the auto-ignition temperature of the primary propellant grain 26 yet higher than the auto-ignition temperature of the primary insensitive munitions charge 150.

It is presently preferred in this embodiment for the secondary insensitive munitions charge 200 to be positioned in close proximity to the end burn surface of the primary propellant grain 26, and more preferably in close proximity or contact with the nipple 26*a* of the primary propellant grain 26. As shown in FIG. 7, the secondary insensitive munitions charge 200 may be placed in a recess at the front surface of the tapered rubber insulator 90. As with the case of the primary insensitive munitions charge 150, the secondary insensitive munitions charge 200 can be annular or may comprise a discrete piece or a plurality of discrete pieces spaced (e.g., circumferentially) from each other.

The use of the second insensitive munitions charge 200 is especially advantageous for rocket motors 14 having primary propellant grain 26 that undergo severe combustion reactions. Because the secondary insensitive munitions charge 200 has a higher auto-ignition temperature than the primary insensitive munitions charge 150, the secondary insensitive munitions charge 200 will not undergo auto-ignition until subsequent to auto-ignition of the primary insensitive munitions charge 150 and, hence, bursting of the case 23. By the time the secondary insensitive munitions charge 200 auto-ignites, the case 23 will already have been vented. Preferably, the auto-ignition temperature of the secondary insensitive munitions charge 200 is about 50° F. (about 28° C.) higher than that of the primary insensitive munitions charge 150.

Further, because the secondary insensitive munitions charge 200 has a lower auto-ignition temperature than the primary propellant grain 26, the propellant grain 26 will be ignited at its aft surface before the total propellant grain 26 can undergo auto-ignition. As a consequence, ignition of the primary propellant grain 26 is largely isolated to a single position (or a plurality of positions) at which the secondary insensitive munitions charge 200 is located. Furthermore, the close proximity of the secondary insensitive munitions charge 200 to the aft surface of the primary propellant grain 26 causes the primary propellant grain 26 to be ignited at its aft surface, where intended. The ignition of the primary propellant grain 26 at its aft surface leads to a relatively nonviolent reaction at essentially ambient pressure and produces very low propulsive thrust and lower likelihood of propulsive fragments. Preferably, the auto-ignition temperature of the secondary insensitive munitions charge 200 is about 350° F. (about 177° C.). It is believed that those having ordinary skill in the art and reference to this disclosure can identify suitable secondary insensitive munitions charges 200 without undue experimentation.

The foregoing detailed description of the preferred embodiments of the invention has been provided for the purposes of illustration and description and is not intended to be exhaustive or to limit the invention to the precise embodiments disclosed. The embodiments were chosen and described in order to best explain the principles of the invention and its practical application, thereby enabling others skilled in the art to understand the invention for various embodiments and with various modifications as are suited to the particular use contemplated. It is intended that the scope of the invention cover various modifications and equivalents included within the spirit and scope of the appended claims.

What is claimed is:

1. A rocket motor having insensitive munitions capability, the rocket motor comprising:

- a case that is rupturable at an internal pressure burst level, the case comprising:
  - a propellant located in the case, the propellant formulated to thermally expand when heated to a temperature below an autoignition temperature of the propellant and to apply an internal pressure to the case that is less than the internal pressure burst level of the case; and
  - an insensitive munitions charge located in the case, the insensitive munitions charge formulated to release gas when heated to a temperature above an autoignition temperature of the insensitive munitions charge, wherein the released gas in combination with the internal pressure applied by the propellant is sufficient to raise an internal pressure inside the case above the internal pressure burst level of the case.

2. The rocket motor of claim 1, wherein the propellant is formulated to undergo thermal expansion so as to fill free volume inside the case.

3. The rocket motor of claim 1, wherein the insensitive munitions charge is formulated to have an autoignition temperature below the autoignition temperature of the propellant.

4. The rocket motor of claim 1, wherein the internal pressure applied by expansion of the propellant and the gas released by the insensitive munitions charge is selected to rupture the case before the propellant reaches its autoignition temperature.

5. The rocket motor of claim 1, wherein the propellant is formulated to undergo thermal expansion so as to fill free volume inside the case with the propellant at about 66° C.

6. The rocket motor of claim 1, wherein the propellant is formulated to have an autoignition temperature of about 238° C.

7. The rocket motor of claim 1, wherein the insensitive munitions charge is formulated to have an autoignition temperature of at least about 56° C. below the autoignition temperature of the propellant.

8. The rocket motor of claim 1, wherein an internal pressure of the gas released by the insensitive munitions charge is not more than 25 percent of the internal pressure applied by the thermal expansion of the propellant.

9. The rocket motor of claim 1, wherein the case comprises a cylindrical region, a closed forward end, and an aft assembly, the aft assembly comprising an aft closure member provided with an opening.

10. The rocket motor of claim 1, further comprising:

- a nozzle assembly coupled to the case, the nozzle assembly comprising a nozzle passageway; and
- an igniter assembly operational between an inactive state, in which the nozzle passageway is obstructed, and an activated state, in which the igniter assembly is functional to ignite the propellant and the nozzle passageway is substantially unobstructed to permit flow through the nozzle passageway.

11. The rocket motor of claim 9, wherein the insensitive munitions charge is situated between the aft closure member and the propellant.

12. The rocket motor of claim 9, further comprising a rubber insulator comprising a radially extending portion situated between the propellant and the aft assembly, wherein the insensitive munitions charge is situated in contact with the radially extending portion of the rubber insulator.

13. The rocket motor of claim 9, further comprising a rubber insulator comprising a radially extending portion and an axial extension, the radially extending portion of the rubber insulator being situated between the propellant and the aft assembly, the axial extension being situated between the propellant and the cylindrical region of the case.

14. The rocket motor of claim 13, wherein the axial extension of the rubber insulator is spaced radially from the cylindrical region of the case to form a cylindrical void area therebetween.

15. The rocket motor of claim 10, further comprising a throat-barrier member for obstructing the nozzle passageway.

16. The rocket motor of claim 15, wherein the throat-barrier member comprises an erosive nozzle piece.

17. The rocket motor of claim 1, further comprising a secondary insensitive munitions charge positioned in close proximity to an aft surface of the propellant, the second insensitive munitions charge having an autoignition temperature at which the second insensitive munitions charge autoignites to release gas, the autoignition temperature of the second insensitive munitions charge being below the autoignition temperature of the propellant and being above the autoignition temperature of the insensitive munitions charge.

18. The rocket motor of claim 1, wherein the propellant comprises a composite propellant.

19. The rocket motor of claim 1, wherein the propellant comprises ammonium perchlorate, aluminum, and hydroxyl terminated polybutadiene.

20. The rocket motor of claim 1, wherein the propellant comprises a double-base propellant.

21. The rocket motor of claim 1, wherein the insensitive munitions charge comprises a rocket propellant.

22. The rocket motor of claim 1, wherein the insensitive munitions charge is selected from the group consisting of a dihydroxyglyoxime propellant, a hydroxy-terminated polyether, and a random 50:50 copolymer of polytetrahydrofuran and polyethyleneglycol.

23. The rocket motor of claim 1, wherein the insensitive munitions charge comprises a dihydroxyglyoxime propellant.

* * * * *

UNITED STATES PATENT AND TRADEMARK OFFICE

CERTIFICATE OF CORRECTION

PATENT NO. : 6,966,264 B2 
APPLICATION NO. : 10/645706
DATED : November 22, 2005
INVENTOR(S) : Mark A. Solberg and Robert E. Black It is certified that error appears in the above-identified patent and that said Letters Patent is hereby corrected as shown below:

On the title page:
In ITEM (56) References Cited change "10/1967 Pagel" to --10/1967 Paget--

COLUMN 4, LINE 33, change "rocket motor bum." to --rocket motor burn.--
COLUMN 4, LINE 56, change "a gun gun-launched" to --a gun-launched--
COLUMN 5, LINE 41, change "thereof" to --thereof.--
COLUMN 11, LINES 27-33, delete "An insensitive munitions charge 150 is illustrated positioned in an annular recess of and contacting the tapered rubber insulator 90, with an aft surface of the insensitive munitions charge 150 positioned flush against the forward surface 70 of the flange 60. Although shown having an annular shape, the insensitive munitions charge 150 may have other shapes and"

Signed and Sealed this

Third Day of March, 2009

JOHN DOLL
*Acting Director of the United States Patent and Trademark Office*